United States Patent
Peng et al.

(10) Patent No.: US 11,039,396 B2
(45) Date of Patent: Jun. 15, 2021

(54) COMMUNICATION METHOD, SIGNAL TRANSMITTER CIRCUIT, AND SIGNAL RECEIVER CIRCUIT CAPABLE OF REDUCING POWER CONSUMPTION

(71) Applicant: Realtek Semiconductor Corp., HsinChu (TW)

(72) Inventors: Zuohui Peng, Suzhou (CN); Qin Zhang, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/703,791

(22) Filed: Dec. 4, 2019

(65) Prior Publication Data
US 2020/0413332 A1 Dec. 31, 2020

(30) Foreign Application Priority Data

Jun. 27, 2019 (CN) .......................... 201910567885.6

(51) Int. Cl.
  *H04W 52/02* (2009.01)
  *H04L 29/06* (2006.01)
(52) U.S. Cl.
  CPC ........... *H04W 52/029* (2013.01); *H04L 69/22* (2013.01); *H04W 52/0229* (2013.01)
(58) Field of Classification Search
  CPC .... H04L 69/22; H04L 47/10; H04W 52/0229; H04W 52/029; H04W 28/065; G06F 5/10
  See application file for complete search history.

(56) References Cited

U.S. PATENT DOCUMENTS

| 8,498,328 | B2* | 7/2013 | Dhandu | H04L 1/0026 375/222 |
| 2004/0210684 | A1 | 10/2004 | Granig | |
| 2007/0081504 | A1* | 4/2007 | Shih | H04W 52/0235 370/338 |
| 2007/0126584 | A1* | 6/2007 | Hyde | H04B 5/0062 340/572.4 |
| 2011/0085607 | A1* | 4/2011 | Dhandu | H04L 1/0002 375/259 |
| 2013/0064194 | A1 | 3/2013 | Christin | |
| 2015/0279299 | A1* | 10/2015 | Liou | H03L 7/0802 345/211 |

FOREIGN PATENT DOCUMENTS

TW  556434  10/2003

* cited by examiner

*Primary Examiner* — Phuc H Tran
(74) *Attorney, Agent, or Firm* — Winston Hsu

(57) ABSTRACT

A communication method includes the following steps: acquiring a data rate of a data packet; setting a clock frequency of at least one component disposed along a data transmitting path or a data receiving path of a communication system according to the data rate of the data packet, and processing the data packet after the clock frequency of the at least one component disposed along the data transmitting path or the data receiving path of the communication system is set. When the data packet has a higher data rate, the clock frequency of the at least one component is set to a higher clock frequency. When the data packet has a lower data rate, the clock frequency of the at least one component is set to a lower clock frequency.

20 Claims, 3 Drawing Sheets

COMMUNICATION METHOD, SIGNAL TRANSMITTER CIRCUIT, AND SIGNAL RECEIVER CIRCUIT CAPABLE OF REDUCING POWER CONSUMPTION

BACKGROUND OF THE INVENTION

1. Field of the Invention

The present disclosure provides a communication method, a signal transmitter circuit, and a signal receiver circuit, and more particularly, a communication method, a signal transmitter circuit, and a signal receiver circuit capable of reducing power consumption by dynamically adjusting a clock frequency according to a data rate of a data packet.

2. Description of the Prior Art

With the advancements of wireless communication technologies, portable devices can support various wireless network protocols and wireless link establishment functions. For example, tablets, smart phones, or personal digital assistants can support Bluetooth data transmission or Wi-Fi data transmission. Currently, performing wireless data transmission functions with low power consumption is an important and challenging goal for portable devices since the power capacities of the portable devices are limited.

When transceiver functions of a wireless communication device are enabled, the power consumption is related to a circuit load, an operating voltage, and a clock frequency of the wireless communication device. The circuit load depends on a manufacturing process. For example, the circuit load is highly related to die sizes. The operating voltage is related to the manufacturing process, the clock frequency, and functions of the wireless communication device. Moreover, when the circuit load, the operating voltage, or the clock frequency is high, the power consumption of the wireless communication device is also high.

In order to reduce the power consumption of the wireless communication device, some methods are adopted. In the first method, a clock gating technology is used. A purpose of the clock gating technology is to reduce a frequency of unnecessarily toggling by some or all transistors of the wireless communication device for saving power. In the second method, an advanced manufacturing process is introduced for reducing die sizes and reducing the operating voltage. Therefore, the power consumption of the wireless communication device can be reduced. However, in the current wireless communication device, the clock frequency is set to a highest data rate in a physical layer supported by the wireless communication device. For example, a clock frequency of 80 M (Mega) Hertz corresponds to a data rate of 150 M bps (bits per second). The clock frequency is a fixed constant, such as 80 M Hz. Therefore, when a data rate (1 Mbps) of the wireless communication device (e.g., the data rate of the wireless communication device exchanging data with an access point) is less than the highest data rate in the physical layer, the wireless communication device still uses the highest data rate in the physical layer for performing the data transmission function. Therefore, the highest data rate in the physical layer used in the wireless communication device may result in additional power consumption.

SUMMARY OF THE INVENTION

In an embodiment of the present disclosure, a communication method capable of reducing power consumption is provided. The communication method includes the following steps: acquiring a data rate of a data packet, setting a clock frequency of at least one component disposed along a data transmitting path or a data receiving path of a communication system according to the data rate of the data packet, and processing the data packet after the clock frequency of the at least one component disposed along the data transmitting path or the data receiving path of the communication system is set. When the data packet has a higher data rate, the clock frequency of the at least one component is set to a higher clock frequency. When the data packet has a lower data rate, the clock frequency of the at least one component is set to a lower clock frequency.

In another embodiment of the present disclosure, a signal transmitter circuit is provided. The signal transmitter circuit includes a transmit data buffering device, at least one transmit data processing component, a transmitter, and a processor. The transmit data buffering device is configured to buffer a data packet. The at least one transmit data processing component is coupled to the transmit data buffering device and configured to process the data packet for generating a transmit data packet. The transmitter is coupled to the at least one transmit data processing component and configured to transmit the transmit data packet. The processor is coupled to the transmit data buffering device, the at least one transmit data processing component, and the transmitter, and configured to control the transmit data buffering device, the at least one transmit data processing component, and the transmitter. The processor acquires a data rate of the data packet and sets a clock frequency of at least one component of the signal transmitter circuit according to the data rate of the data packet. When the data packet has a higher data rate, the clock frequency of the at least one component is set to a higher clock frequency. When the data packet has a lower data rate, the clock frequency of the at least one component is set to a lower clock frequency.

In another embodiment of the present disclosure, a signal receiver circuit is provided. The signal receiver circuit includes a receiver, at least one receive data processing component, a receive data buffering device, and a processor. The receiver is configured to receive a transmit data packet for generating a receive data packet. A data packet is processed to generate the transmit data packet and then transmitted to the receiver by using a signal transmitter circuit. The at least one receive data processing component is coupled to the receiver and configured to process the receive data packet for restoring the data packet from the receive data packet. The receive data buffering device is coupled to the at least one receive data processing component, and configured to buffer the data packet. The processor is coupled to the receiver, the at least one receive data processing component, and the receive data buffering device, and configured to control the receiver, the at least one receive data processing component, and the receive data buffering device. The processor acquires a data rate of the data packet and sets a clock frequency of at least one component of the signal receiver circuit according to the data rate of the data packet. When the data packet has a higher data rate, the clock frequency of the at least one component is set to a higher clock frequency. When the data packet has a lower data rate, the clock frequency of the at least one component is set to a lower clock frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
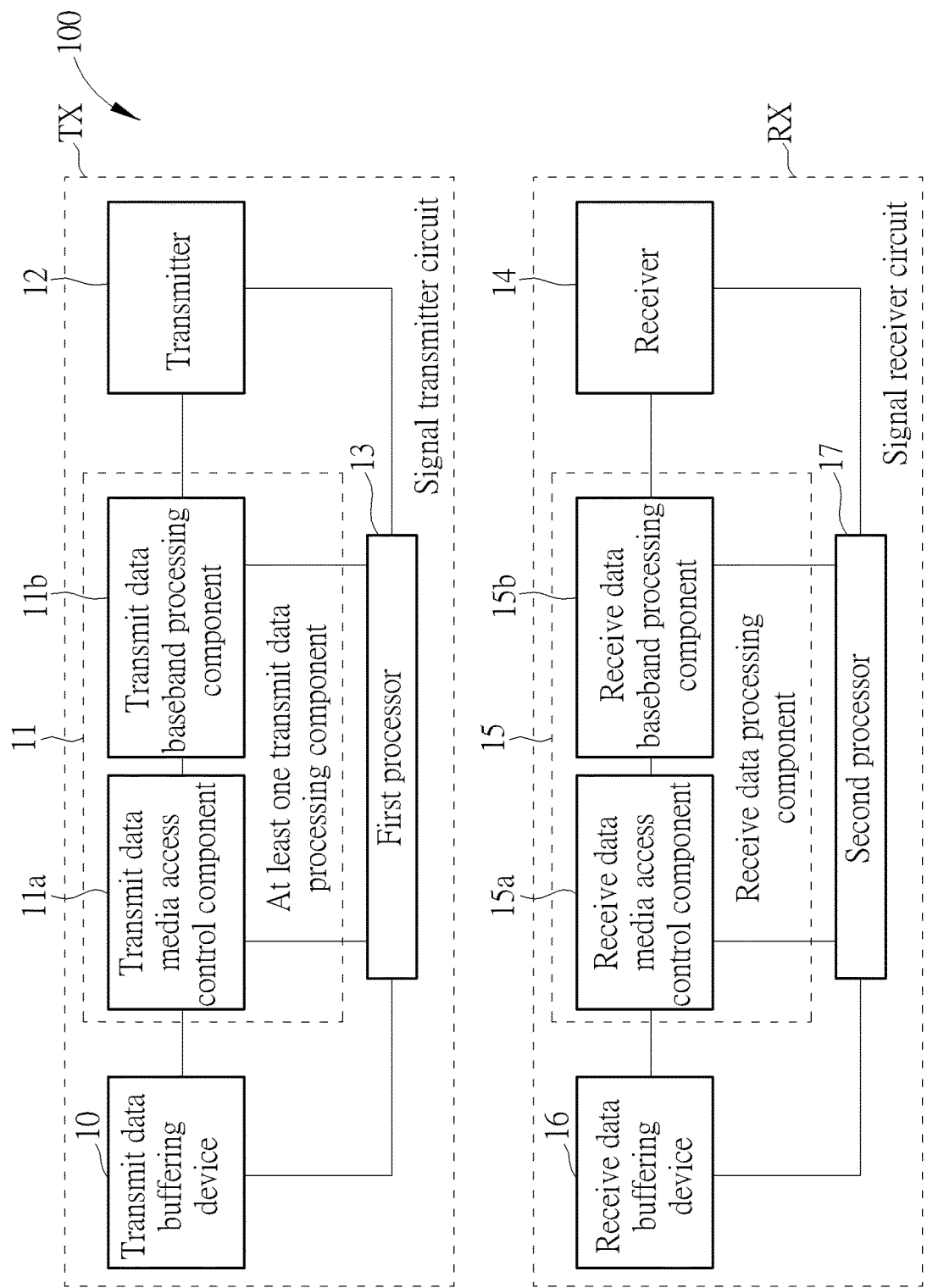
FIG. 1 is a structure of a communication system according to the embodiment of the present disclosure.

FIG. 1 is a structure of a communication system 100 according to the embodiment of the present disclosure. The communication system 100 can be any wireless communication system with a pair-wised transmitter device and a receiver device. The communication system 100 can also transmit data by using any reasonable communication protocol. In FIG. 1, the communication system 100 includes a signal transmitter circuit TX and a signal receiver circuit RX. The signal transmitter circuit TX and the signal receiver circuit RX may be regarded as pair-wised data communicating nodes, such as a terminal device (i.e., a mobile station, STA) and an access point (AP). The signal transmitter circuit TX may include a transmit data buffering device 10, at least one transmit data processing component 11, and a transmitter 12. The transmit data buffering device 10 is used for buffering a data packet. The at least one transmit data processing component 11 is coupled to the transmit data buffering device 10 for processing the data packet in order to generate a transmit data packet. Here, the at least one transmit data processing component 11 can be any hardware or algorithm capable of performing data encoding, data compression, data modulation, or any data processing functions. For example, a transmit data media access control component 11a and/or a transmit data baseband processing component 11b can be integrated into the at least one transmit data processing component 11. The transmit data media access control component 11a can be used for addressing the data packet and controlling a media accessing process of the data packet so as to communicate the data packet with various network nodes or network devices. The transmit data baseband processing component 11b can be used for processing the data packet in a baseband frequency spectrum. However, the at least one transmit data processing component 11 can also include more data processing components than those illustrated in FIG. 1. Any reasonable hardware modification of the signal transmitter circuit TX falls into the scope of the present invention. The transmitter 12 is coupled to the at least one transmit data processing component 11 for transmitting the transmit data packet. In the communication system 100, the transmitter 12 may include a digital to analog converter and a wireless radio frequency signal emitter. The digital to analog converter can convert a waveform of the transmit data packet from a digital signal to an analog signal. The wireless radio frequency signal emitter can emit the analog signal outputted by the digital to analog converter in a form of an electromagnetic wave signal. The signal transmitter circuit TX may further include a first processor 13. The first processor 13 is coupled to the transmit data buffering device 10, the at least one transmit data processing component 11, and the transmitter 12 for controlling the transmit data buffering device 10, the at least one transmit data processing component 11, and the transmitter 12.

The signal receiver circuit RX includes a receiver 14, at least one receive data processing component 15, and a receive data buffering device 16. The receiver 14 is used for receiving a transmit data packet for generating a receive data packet. As previously mentioned, the data packet can be processed to generate the transmit data packet and then transmitted to the receiver 14 by using the signal transmitter circuit TX. The receiver 14 may include a radio frequency signal receiver and an analog to digital converter. The radio frequency signal receiver can be used for receiving electromagnetic energy of the transmit data packet emitted from the transmitter 12. The analog to digital converter can be used for digitizing the transmit data packet for generating the receive data packet. The at least one receive data processing component 15 is coupled to the receiver 14 for processing the receive data packet in order to restore the data packet from the receive data packet. Here, the at least one receive data processing component 15 can be any hardware or algorithm capable of performing data decoding, data decompression, data demodulation, or any data restoring function. For example, a receive data media access control component 15a and/or a receive data baseband processing component 15b can be integrated into the at least one receive data processing component 15. Functionalities of the receive data media access control component 15a and the receive data baseband processing component 15b correspond to the transmit data media access control component 11a and the transmit data baseband processing component 11b respectively. Thus, details are omitted here. However, the at least one receive data processing component 15 may also include more data processing components than those illustrated in FIG. 1. Any reasonable hardware modification of the signal receiver circuit RX falls into the scope of the present invention. The receive data buffering device 16 is coupled to the at least one receive data processing component 15 for buffering the data packet. The signal receiver circuit RX can further include a second processor 17. The second processor 17 is coupled to the receiver 14, the at least one receive data processing component 15, and the receive data buffering device 16 for controlling the receiver 14, the at least one receive data processing component 15, and the receive data buffering device 16. In the communication system 100, the first processor 13 and the second processor 17 can be two processing chips capable of supporting any communication protocol. For example, the first processor 13 and the second processor 17 can be two Wi-Fi chips or two Bluetooth chips. In other embodiments, the first processor 13 and the second processor 17 can be integrated into one processor.

In the communication system 100, the first processor 13 or the second processor 17 can acquire or decide a data rate of the data packet. For example, the second processor 17 can acquire or decide a data receiving rate of the receive data packet through the receiver 14. The first processor 13 can acquire or determine a data transmitting rate of the data packet prepared to be transmitted by the transmitter 12. In other words, the data rate can be defined as the data transmitting rate or the data receiving rate. The communication system 100 can set a clock frequency of at least one component of the signal transmitter circuit TX or the signal receiver circuit RX according to the data rate of the data packet. After the clock frequency is set, the communication system 100 can perform data communication between the signal transmitter circuit TX and the signal receiver circuit RX accordingly. Specifically, When the data packet has a higher data rate, the clock frequency of the at least one component can be set to a higher clock frequency. When the data packet has a lower data rate, the clock frequency of the at least one component can be set to a lower clock frequency. After the clock frequency of the communication system 100 is set, the data packet can be processed. Since the communication system 100 can dynamically adjust the clock frequency of at least one component according to the data rate of the data packet (i.e., the transmit data packet or the receive data packet), power consumption of the communication systems 100 can be reduced. Details of a communication method with low power consumption performed by the communication system 100 are illustrated later.

Figure 2:
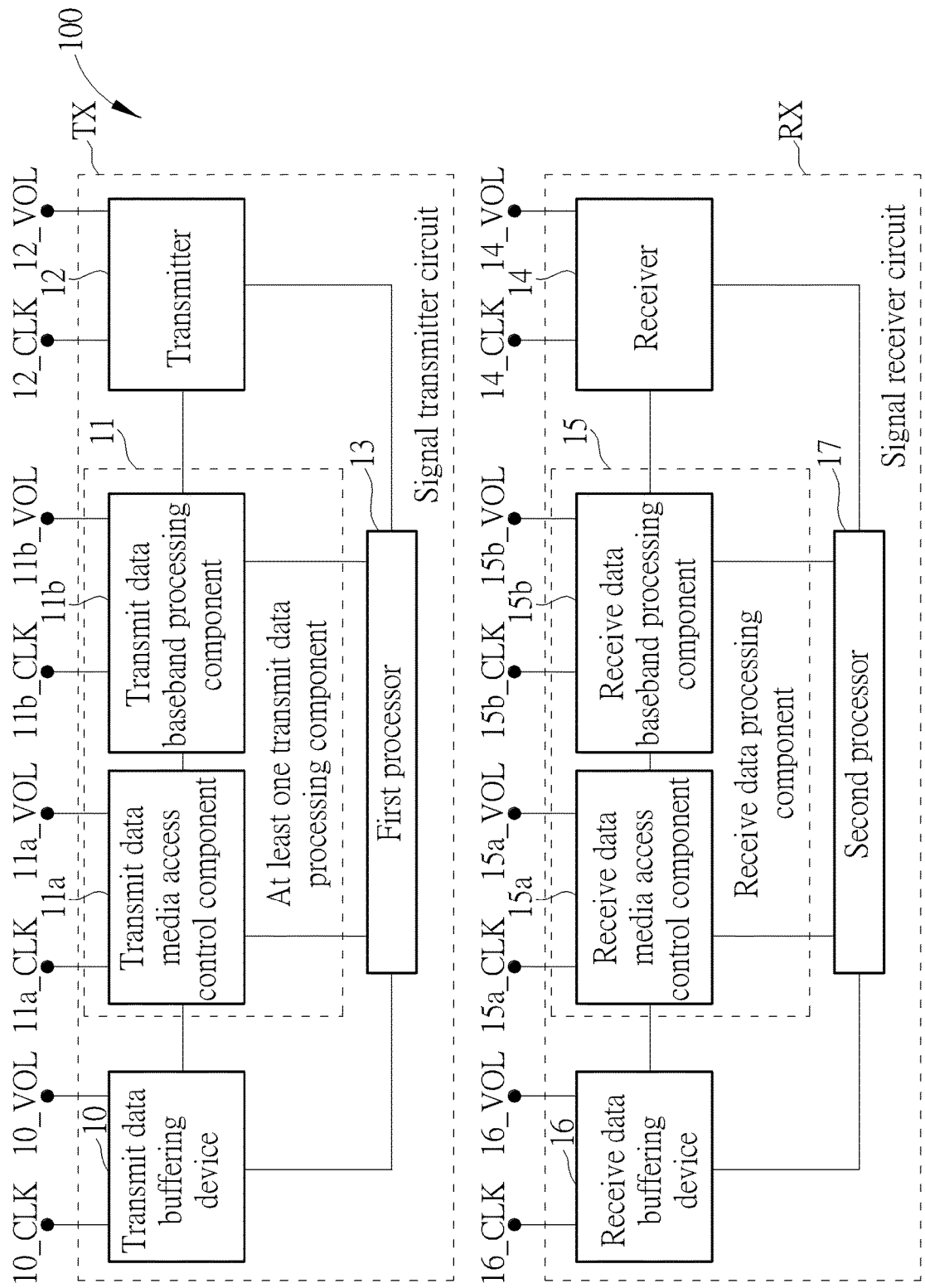
FIG. 2 is an illustration of setting a clock frequency and/or a driving voltage of at least one component of the communication system in FIG. 1.

FIG. 2 is an illustration of setting the clock frequency and/or a driving voltage of the at least one component of the communication system 100. In FIG. 2, in the signal transmitter circuit TX of the communication system 100, the first processor 13 can be regarded as an active terminal for setting the clock frequency of the at least one component. In the signal transmitter circuit TX, the transmit data buffer device 10 can be driven according to a clock signal 10_CLK and a driving voltage 10_VOL. The transmit data media access control component 11a can be driven according to a clock signal 11a_CLK and a driving voltage 11a_VOL. The transmit data baseband processing component 11b can be driven according to a clock signal 11b_CLK and a driving voltage 11b_VOL. The transmitter 12 can be driven according to a clock signal 12_CLK and a driving voltage 12_VOL. The first processor 13 can acquire a system default data rate of the transmit data packet of a physical layer. The first processor 13 can also acquire a user-defined data rate of the transmit data packet of the physical layer. Here, the data rate can be equal to a data transmitting rate of the transmit data packet emitted from the transmitter 12. After the first processor 13 acquires the data rate of the data packet, the first processor 13 can set a clock frequency of at least one component disposed along a data transmitting path. For example, for the signal transmitter circuit TX, components disposed along the data transmitting path can include the transmit data buffering device 10, the transmit data media access control component 11a, the transmit data baseband processing component 11b, and the transmitter 12. The first processor 13 can set a clock frequency of at least one of the clock signal 10_CLK, the clock signal 11a_CLK, the clock signal 11b_CLK, and the clock signal 12_CLK according to the data transmitting rate. Further, when the data packet has a higher data transmitting rate, the clock frequency used by the signal transmitter circuit TX is set to a higher clock frequency. When the data packet has a lower data transmitting rate, the clock frequency used by the signal transmitter circuit TX is set to a lower clock frequency. For example, a data rate with 150 M bps (bits per second) corresponds to a clock frequency with 20 M (Mega) Hertz. A data rate with 1 M bps corresponds to a clock frequency with 128K (Kilo) Hertz. Since the clock frequency of at least one component of the signal transmitter circuit TX can be dynamically adjusted instead of being set to a maximum transmitting clock frequency supported by the physical layer, power consumption of the communication system 100 can be reduced. Further, in the signal transmitter circuit TX of the communication system 100, the first processor 13 can set a driving voltage of at least one component of the signal transmitter circuit TX according to the data transmitting rate. For example, in the signal transmitter circuit TX, the first processor 13 can set at least one of the driving voltage 10_VOL, the driving voltage 11a_VOL, the driving voltage 11b_VOL, and the driving voltage 12_VOL according to the data transmitting rate. Also, when the at least one component of the signal transmitter circuit TX has a higher clock frequency, the first processor 13 sets the driving voltage to a higher driving voltage. When the at least one component of the signal transmitter circuit TX has a lower clock frequency, the first processor 13 sets the driving voltage to a lower driving voltage. Therefore, by appropriately setting the clock frequency and the driving voltage of at least one component of the signal transmission circuit TX simultaneously, the communication system 100 can further reduce power consumption.

In the signal receiver circuit RX of the communication system 100, the receive data packet includes a physical layer convergence procedure (PLOP) header. The second processor 17 can analyze the physical layer convergence procedure header of the receive data packet for detecting the data receiving rate of the physical layer under an initial clock frequency. Here, the data rate can be regarded as the data receiving rate of the physical layer. In the signal receiver circuit RX, the receiver 14 can be driven according to a clock signal 14_CLK and a driving voltage 14_VOL. The receive data baseband processing component 15b can be driven according to the clock signal 15b_CLK and the driving voltage 15b_VOL. The receiving data media access control component 15a can be driven according to the clock signal 15a_CLK and the driving voltage 15a_VOL. The receive data buffering device 16 can be driven according to the clock signal 16_CLK and the driving voltage 16_VOL. After the second processor 17 acquires the data receiving rate, the second processor 17 can set a clock frequency of at least one component disposed along a data receiving path. For example, for the signal receiver circuit RX, components disposed along the data receiving path may include the receiver 14, the receive data baseband processing component 15b, the receive data media access control component 15a, and the receive data buffering device 16. The second processor 17 can set a clock frequency of at least one of the clock signal 14_CLK, the clock signal 15a_CLK, the clock signal 15b_CLK, and the clock signal 16_CLK according to the data receiving rate. Further, when the data packet has a higher data receiving rate, the clock frequency used by the signal receiver circuit RX is set to a higher clock frequency. When the data packet has a lower data transmitting rate, the clock frequency used by the signal receiver circuit RX is set to a lower clock frequency. Since the clock frequency of at least one component of the signal receiver circuit RX can be dynamically adjusted instead of being set to a maximum receiving clock frequency supported by the physical layer, the communication system 100 can reduce power consumption. Further, in the signal receiver circuit RX of the communication system 100, the second processor 17 can set a driving voltage of at least one component of the signal receiver circuit RX according to the data receiving rate. For example, in the signal receiver circuit RX, the second processor 17 can set at least one of the driving voltage 14_VOL, the driving voltage 15a_VOL, the driving voltage 15b_VOL, and the driving voltage 16_VOL according to the data receiving rate. Also, when the at least one component of the signal receiver circuit RX has a higher clock frequency, the second processor 17 sets the driving voltage to a higher driving voltage. When the at least one component of the signal receiver circuit RX has a lower clock frequency, the second processor 17 sets the driving voltage to a lower driving voltage. Therefore, by appropriately setting the clock frequency and the driving voltage of at least one component of the signal receiver circuit RX simultaneously, power consumption of the communication system 100 can be further reduced.

Figure 3:
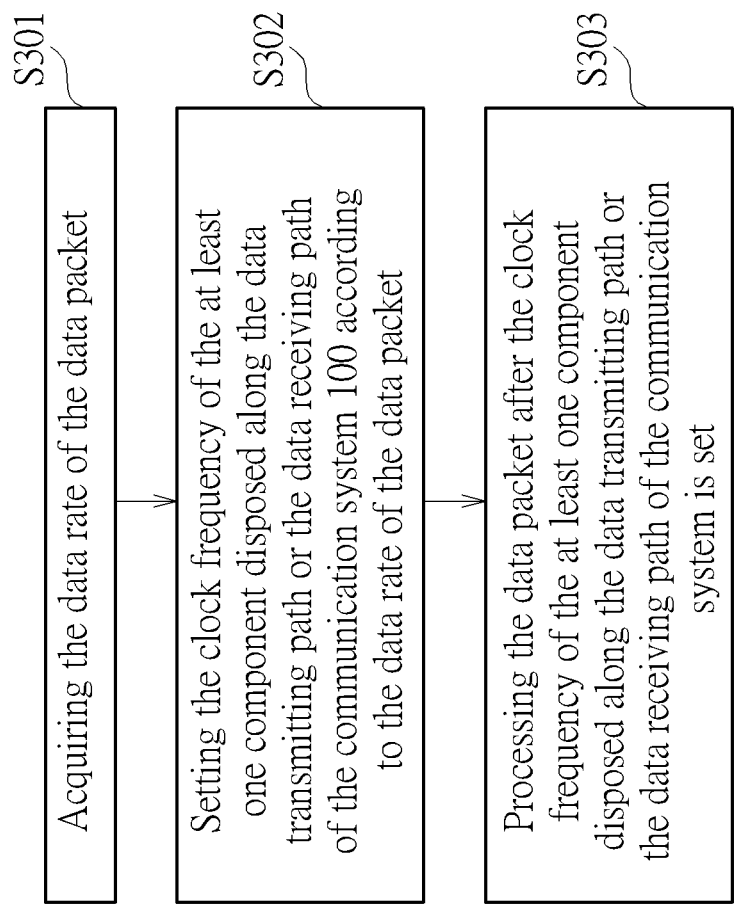
FIG. 3 is a flow chart of a communication method capable of reducing power consumption performed by the communication system in FIG. 1.

FIG. 3 is a flow chart of a communication method capable of reducing power consumption performed by the communication system 100. The communication method includes steps S301-S303. Any reasonable modification falls into the scope of the present invention. Step S301 to step S303 are illustrated below.

step S301: acquiring the data rate of the data packet;

step S302: setting the clock frequency of the at least one component disposed along the data transmitting path or the data receiving path of the communication system 100 according to the data rate of the data packet;

step S303: processing the data packet after the clock frequency of the at least one component disposed along the data transmitting path or the data receiving path of the communication system is set.

Details of step S301 to step S303 are previously illustrated, and thus they are omitted here. As mentioned previously, when the transceiver functions of the communication system 100 are enabled, the power consumption is related to the circuit load, the operating voltage, and the clock frequency. However, since the circuit load depends on the manufacturing process, a circuit load optimization design is limited. In order to further reduce power consumption, the communication system 100 can dynamically adjust the clock frequency of at least one component according to the data rate of the data packet (i.e., the transmit data packet or the receive data packet). Further, an adjustable frequency range of the clock signal and the number of adjustable components are not limited in the communication system 100. Any technology for adaptively or dynamically adjusting the clock frequency of the communication system 100 for reducing the power consumption falls into the scope of the present invention.

To sum up, the present disclosure provides a communication system and communication method capable of reducing power consumption. The communication system can dynamically adjust a clock frequency of at least one component according to a data rate of a data packet (i.e., a transmit data packet or a receive data packet) for performing data communication operation with low power consumption. Particularly, variations of the data rate may be introduced based on a data packet format, a wireless channel quality, a channel shadowing effect, and user configurations. In current communication system, since its constant clock frequency is irrelevant to the data rate, it cannot reduce the power consumption according to the variations of the data rate. However, in the communication system of the present invention, since the clock frequency can be dynamically adjusted according to the data rate, the power consumption can be minimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method capable of reducing power consumption comprising:
   acquiring a data rate of a data packet;
   setting a clock frequency of at least one component disposed along a data transmitting path or a data receiving path of a communication system according to the data rate of the data packet;
   synchronizing a first clock frequency of the data transmitting path with a second clock frequency of the data receiving path of the communication system according to the clock frequency by a processor; and
   processing the data packet after the first clock frequency of the data transmitting path and the second clock frequency of the data receiving path are synchronized according to the clock frequency;
   wherein when the data packet has a higher data rate, the clock frequency of the at least one component is set to a higher clock frequency, and when the data packet has a lower data rate, the clock frequency of the at least one component is set to a lower clock frequency.

2. The method of claim 1, further comprising:
   setting a driving voltage of the at least one component disposed along the data transmitting path or the data receiving path of the communication system according to the data rate of the data packet;
   wherein when the at least one component has a higher clock frequency, the driving voltage is set to a higher driving voltage, and when the at least one component has a lower clock frequency, the driving voltage is set to a lower driving voltage.

3. The method of claim 1, wherein the data packet is a receive data packet of the communication system, and the data rate is a data receiving rate of a physical layer.

4. The method of claim 3, wherein the receive data packet comprises a physical layer convergence procedure (PLCP) header.

5. The method of claim 4, further comprising:
   analyzing the physical layer convergence procedure header of the receive data packet for detecting the data receiving rate of the physical layer.

6. The method of claim 1, wherein the data packet is a transmit data packet of the communication system, and the data rate is a data transmitting rate of a physical layer.

7. The method of claim 1, wherein the data transmitting rate of the physical layer is a user-defined data transmitting rate.

8. A signal transmitter circuit of a communication system comprising:
   a transmit data buffering device configured to buffer a data packet;
   at least one transmit data processing component coupled to the transmit data buffering device and configured to process the data packet for generating a transmit data packet;
   a transmitter coupled to the at least one transmit data processing component and configured to transmit the transmit data packet; and
   a processor coupled to the transmit data buffering device, the at least one transmit data processing component, and the transmitter and configured to control the transmit data buffering device, the at least one transmit data processing component, and the transmitter;
   wherein the processor acquires a data rate of the data packet, sets a clock frequency of at least one component of the signal transmitter circuit according to the data rate of the data packet, synchronizes a first clock frequency of a data transmitting path of the communication system with a second clock frequency of a data receiving path of the communication system according to the clock frequency, and processes the data packet after the first clock frequency of the data transmitting path and the second clock frequency of the data receiving path are synchronized according to the clock frequency, when the data packet has a higher data rate, the clock frequency of the at least one component is set to a higher clock frequency, and when the data packet has a lower data rate, the clock frequency of the at least one component is set to a lower clock frequency.

9. The signal transmitter circuit of claim 8, wherein the processor sets a driving voltage of the at least one component according to the data rate of the data packet, when the at least one component has a higher clock frequency, the processor sets the driving voltage to a higher driving voltage, and when the at least one component has a lower clock frequency, the processor sets the driving voltage to a lower driving voltage.

10. The signal transmitter circuit of claim 8, wherein the data rate acquired by the processor is a data transmitting rate of a physical layer.

11. The signal transmitter circuit of claim 10, wherein the data transmitting rate of the physical layer is a user-defined data transmitting rate.

12. The signal transmitter circuit of claim 8, wherein a transmit data media access control component and/or a transmit data baseband processing component is integrated into the at least one transmit data processing component.

13. The signal transmitter circuit of claim 12, wherein the transmit data media access control component is configured to address the data packet and control a media accessing process of the data packet.

14. The signal transmitter circuit of claim 12, wherein the transmit data baseband processing component is configured to process the data packet in a baseband frequency spectrum.

15. A signal receiver circuit of a communication system comprising:
a receiver configured to receive a transmit data packet for generating a receive data packet, wherein a data packet is processed to generate the transmit data packet and then transmitted to the receiver by using a signal transmitter circuit;
at least one receive data processing component coupled to the receiver and configured to process the receive data packet for restoring the data packet from the receive data packet;
a receive data buffering device coupled to the at least one receive data processing component and configured to buffer the data packet; and
a processor coupled to the receiver, the at least one receive data processing component, and the receive data buffering device and configured to control the receiver, the at least one receive data processing component, and the receive data buffering device;
wherein the processor acquires a data rate of the data packet, sets a clock frequency of at least one component of the signal receiver circuit according to the data rate of the data packet, synchronizes a first clock frequency of a data transmitting path of the communication system with a second clock frequency of a data receiving path of the communication system according to the clock frequency, and processes the data packet after the first clock frequency of the data transmitting path and the second clock frequency of the data receiving path are synchronized according to the clock frequency, when the data packet has a higher data rate, the clock frequency of the at least one component is set to a higher clock frequency, and when the data packet has a lower data rate, the clock frequency of the at least one component is set to a lower clock frequency.

16. The signal receiver circuit of claim 15, wherein the data rate acquired by the processor is a data receiving rate of a physical layer.

17. The signal receiver circuit of claim 15, wherein the processor sets a driving voltage of the at least one component according to the data rate of the data packet, when the at least one component has a higher clock frequency, the processor sets the driving voltage to a higher driving voltage, and when the at least one component has a lower clock frequency, the processor sets the driving voltage to a lower driving voltage.

18. The signal receiver circuit of claim 15, wherein the receive data packet comprises a physical layer convergence procedure (PLCP) header.

19. The signal receiver circuit of claim 18, wherein the processor analyzes the physical layer convergence procedure header of the receive data packet for detecting the data receiving rate of the physical layer.

20. The signal receiver circuit of claim 15, wherein the receiver comprises a radio frequency signal receiver and an analog to digital converter, the radio frequency signal receiver is configured to receive electromagnetic energy of the transmit data packet, and the analog to digital converter is configured to digitize the transmit data packet for generating the receive data packet.

* * * * *